C. E. HARMON.
SPRING WHEEL.
APPLICATION FILED APR. 4, 1919.
1,332,871.
Patented Mar. 2, 1920.
2 SHEETS—SHEET 2.
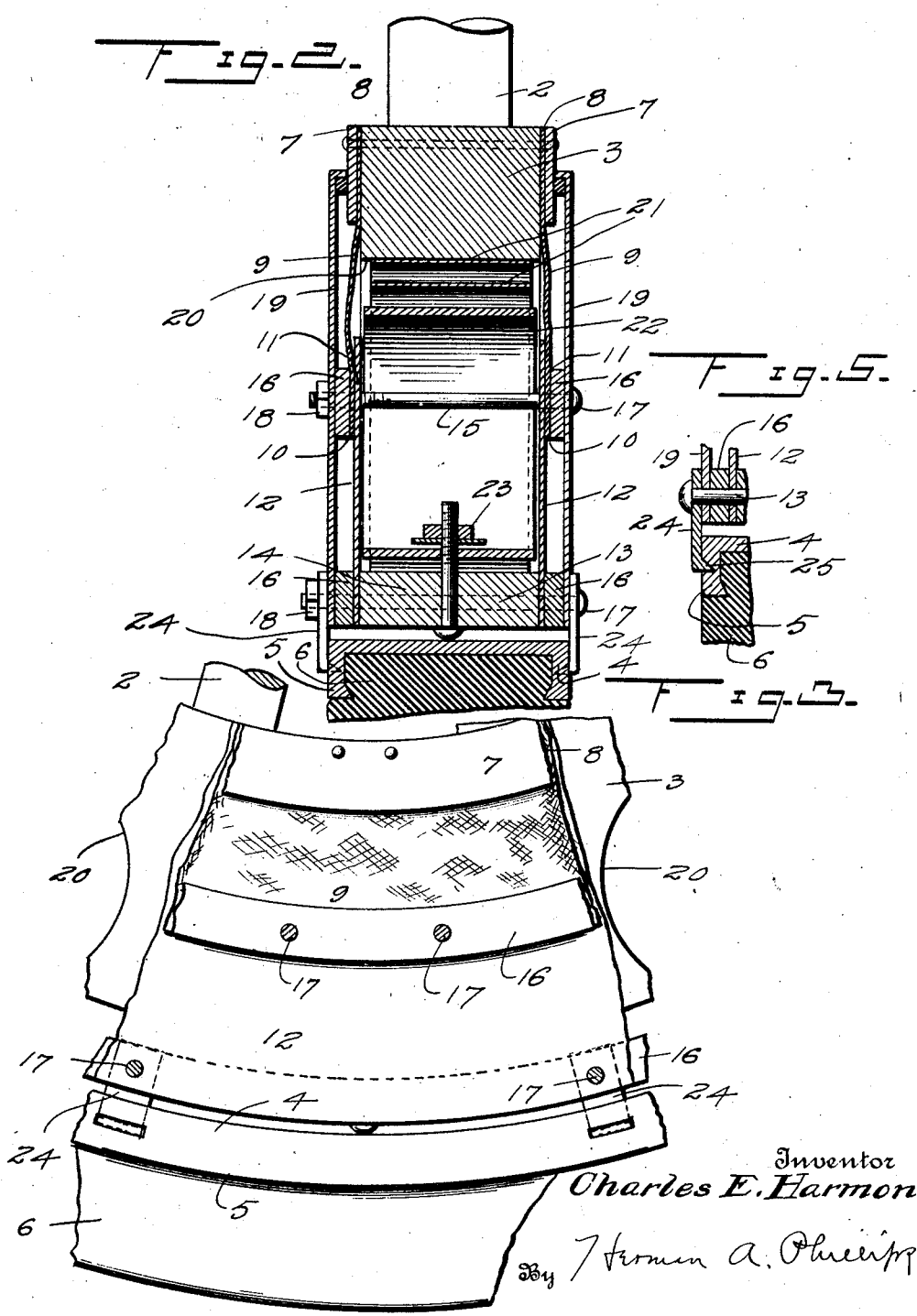
Inventor
Charles E. Harmon.
By Herman A. Phillipp
Attorney

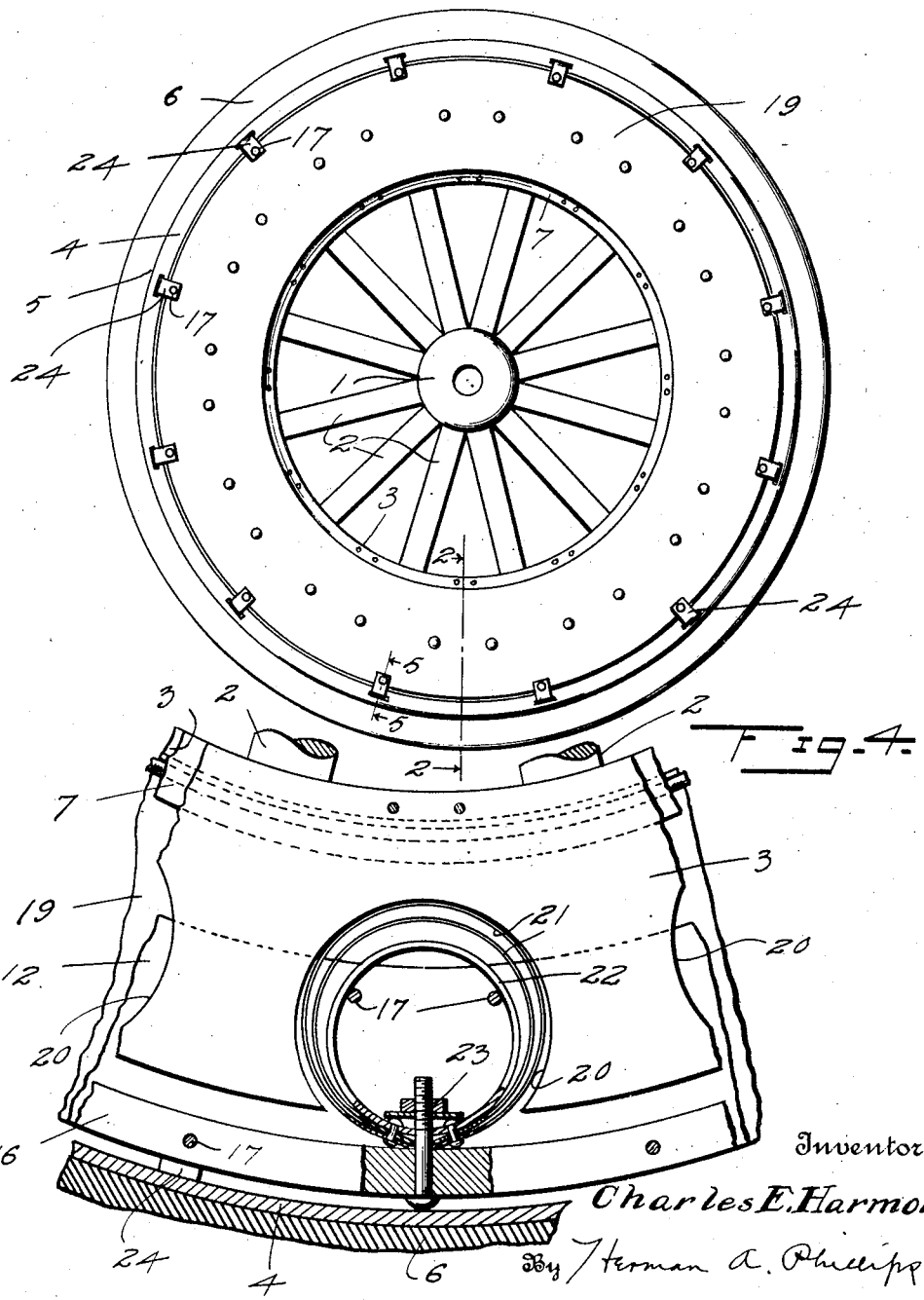

UNITED STATES PATENT OFFICE.

CHARLES E. HARMON, OF ST. PAUL, MINNESOTA, ASSIGNOR OF ONE-THIRD TO R. E. CLINE AND ONE-THIRD TO W. B. AITKIN, BOTH OF ST. PAUL, MINNESOTA.

SPRING-WHEEL.

1,332,871.                     Specification of Letters Patent.        Patented Mar. 2, 1920.

Application filed April 4, 1919. Serial No. 287,436.

*To all whom it may concern:*

Be it known that I, CHARLES E. HARMON, a citizen of the United States, residing at St. Paul, in the county of Ramsey and State of Minnesota, have invented certain new and useful Improvements in Spring-Wheels, of which the following is a specification.

My invention relates to improvements in spring wheels, and refers particularly to what are known as spring or elastic wheels.

One object of my invention is the provision of a wheel of the character stated which will dispose its component parts in proper relation to insure the necessary and desirable strength and durability and which will provide a perfect spring cushioned wheel adaptable to all classes of road surfaces.

Another object of my invention is the provision of a wheel which will be capable of use with a metal rim or an elastic rim and which by its inherent elasticity will dispense with the use of the expensive and objectionable pneumatic tire and still have all the merits of such a tire.

Another object of my invention is the provision of a spring tire which will accommodate itself to the road surface to insure easy riding and which will be composed of a few parts to insure cheapness of production, durability and general efficiency.

To attain the object stated and such others as belong to an invention of this character my invention consists of a spring wheel embodying novel features of construction, combination and arrangement of parts, substantially as shown, described and particularly pointed out in the claims.

Figure 1 is a side elevation of the complete wheel.

Fig. 2 is a sectional view on line 2—2 of Fig. 1.

Figs. 3 and 4 are enlarged views showing the mechanism of the wheel, and

Fig. 5 is a view on line 5—5 of Fig. 1.

Referring by numeral to the drawings in which the same numerals are employed to denote the same parts in all the views:

The numeral 1 designates the hub, 2 the spokes and 3 the felly of the wheel, which parts may be of the usual or any preferred construction, and spaced away from and surrounding the felly is the metal rim 4, which may form the tread of the wheel, or may be formed with flanges 5, to engage and confine the elastic tire 6, forming the preferred form of tread.

To the felly on each side are secured the bands 7, which confine the inner edges 8, of the flat band, washer or flexible connections 9, whose outer edges 10, are confined between the inner edges 11, of the pair of flat bands 12, whose lower ends are clamped by the rods 13, to the circular band 14, the intermediate fastenings 15, and the rods 13, also passing through spacing devices 16, and having their heads 17 and nuts 18, arranged exteriorly and serving to secure the pair of broad flat confining bands 19.

The pair of confining bands thus entirely inclose the mechanism of which the wheel is composed, and the inclosed felly 3, is provided with a series of cavities or pockets 20, whose purpose is to form seats for the circular springs 21, secured to the inner ring 22, and the entire unitary structure being secured to the band 14, by the clamp or fastening 23, this construction being most clearly shown in Fig. 4.

The inclosing bands are secured to the metal rim by means of the series of plates 24, having each a tooth 25, to engage a socket in the rim, as most clearly shown in Fig. 5.

From the foregoing description taken in connection with the drawings it will be noted, that the tread is supported away from the felly by an accommodating connection, that the felly is provided with pockets in which are seated spring members and that the parts are all connected in such relation that a perfect spring and accommodating support is provided between the hub and the rim, and that a wheel constructed as shown and described will dispense with the use of pneumatic tires at a great saving in expense, and will provide a wheel which will prove efficient, satisfactory and practical under all conditions of service.

I claim:

1. A spring wheel including a felly, a band around the felly having a series of outwardly projecting spacing elements therearound, spring supporting means between the felly and said band, a flanged tire supporting rim around the band, and lugs detachably connecting the band and the said rim, said rim being spaced from the band by said spacing elements and having side sockets in its flanges, and said lugs having spurs arranged to enter the said sockets, as described.

2. A spring wheel including a felly having an annular series of spring pockets, a band circumferentially spaced from the felly, circular springs seated within the felly pockets, said springs being projected beyond the felly and secured to said band, flexible connections between the said band and the felly, at the opposite sides of the said spring pockets, side plates secured to the said band and having movable engagement with the sides of the felly, a tire supporting rim carried by said band, and transverse connecting bolts uniting the said side plates and extending through the spring receiving pockets, as described.

3. A spring wheel including a felly having side rings and provided with an annular series of spring receiving pockets open at the opposite sides of the felly, circular springs seated in the said pockets, and projecting beyond the periphery of the felly, flexible strips at opposite sides of the felly, the inner ends of which are engaged and secured by the side rings of the felly, a band surrounding the felly in circumferentially spaced position, radial bolts connecting the springs with the said band, side rings secured at their outer edges to the sides of the said band and projecting inwardly at opposite sides of the spring receiving pockets, transverse bolts extending through the spring receiving pockets, and uniting the inner edges of the said band rings and the outer edges of the flexible connecting members, side plates secured at their outer edges to the band in spaced relation to the band rings, said side plates projecting inwardly and having movable engagement at their inner edges with the felly rings, said side plates receiving the said transverse bolts, and a tire receiving rim around the band.

In testimony whereof I affix my signature.

CHARLES E. HARMON.